(12) United States Patent
Tsutsui et al.

(10) Patent No.: US 8,394,001 B2
(45) Date of Patent: Mar. 12, 2013

(54) AUTOMATIC TRANSMISSION CONTROL DEVICE

(75) Inventors: Hiroshi Tsutsui, Nishio (JP); Yutaka Teraoka, Anjo (JP); Keishi Morita, Anjo (JP); Hiroyuki Fujioka, Anjo (JP); Hiroyasu Amano, Anjo (JP); Masatake Ichikawa, Anjo (JP); Tetsuya Shimizu, Anjo (JP)

(73) Assignee: Aisin Aw Co., Ltd., Aichi (JP)

( * ) Notice: Subject to any disclaimer, the term of this patent is extended or adjusted under 35 U.S.C. 154(b) by 329 days.

(21) Appl. No.: 12/972,893

(22) Filed: Dec. 20, 2010

(65) Prior Publication Data
US 2011/0245005 A1    Oct. 6, 2011

(30) Foreign Application Priority Data
Mar. 30, 2010 (JP) ................. 2010-079146

(51) Int. Cl.
*B60W 10/04* (2006.01)
*F16H 61/26* (2006.01)
(52) U.S. Cl. ............ 477/115; 477/130; 477/187
(58) Field of Classification Search ......... 477/114, 477/115, 127, 128, 130, 131, 141, 187
See application file for complete search history.

(56) References Cited

U.S. PATENT DOCUMENTS

| | | | |
|---|---|---|---|
| 5,334,114 A | 8/1994 | Ando et al. | |
| 5,807,207 A | 9/1998 | Hisano et al. | |
| 7,935,015 B2 * | 5/2011 | Tabata et al. | 475/5 |
| 2003/0171867 A1 * | 9/2003 | Nakamori et al. | 701/54 |
| 2004/0102286 A1 * | 5/2004 | Tabata et al. | 477/3 |
| 2004/0127320 A1 | 7/2004 | Inoue et al. | |
| 2004/0248698 A1 | 12/2004 | Takagi et al. | |
| 2010/0056333 A1 * | 3/2010 | Okumoto et al. | 477/127 |

FOREIGN PATENT DOCUMENTS

| | | |
|---|---|---|
| JP | 5-157164 A | 6/1993 |
| JP | 6-235451 A | 8/1994 |
| JP | 9-324854 A | 12/1997 |
| JP | 2003-106435 A | 4/2003 |
| JP | 2004-125055 A | 4/2004 |
| JP | 2004-286183 A | 10/2004 |

OTHER PUBLICATIONS

International Search Report (ISR) for corresponding International Patent Application No. PCT/JP2011/052489 mailed Apr. 12, 2011.

* cited by examiner

*Primary Examiner* — Roger Pang
(74) *Attorney, Agent, or Firm* — Sughrue Mion, PLLC (57) ABSTRACT

A control device controlling a vehicle's automatic transmission. The automatic transmission engages first and second friction engagement elements by fluid pressure from a pump operating using motive power from the vehicle's motor when a shift position is at a reverse traveling position, places the first friction engagement element on standby at a predetermined pressure that is higher than a stroke starting pressure by which a piston stroke is started and lower than a complete engagement pressure or engages the first friction engagement at the complete engagement pressure when the shift position is at a non-traveling position, and engages a third friction engagement element as a starting shift speed when the shift position is at a forward traveling position. When the shift position is at the forward traveling position, the first friction engagement element is placed on standby at the predetermined pressure if a vehicle speed is lower than a predetermined vehicle speed, or releases the predetermined standby pressure if the vehicle speed is equal to or higher than the predetermined vehicle speed.

6 Claims, 6 Drawing Sheets

|   |     | C-1 | C-2 | C-3 | B-1 | B-2 | F-1 |
|---|-----|-----|-----|-----|-----|-----|-----|
|   | P   |     |     |     |     | △   |     |
|   | REV |     |     | ○   |     | ○   |     |
|   | N   |     |     |     |     | △   |     |
| D | 1st | ○   |     |     |     | (○) | ○   |
|   | 2nd | ○   |     |     | ○   | △   |     |
|   | 3rd | ○   |     | ○   |     |     |     |
|   | 4th | ○   | ○   |     |     |     |     |
|   | 5th |     | ○   | ○   |     |     |     |
|   | 6th |     | ○   |     | ○   |     |     |

(○) ENGAGEMENT WHEN ENGINE BRAKING

|   | C1 | C2 | C3 | C4 | B1 | B2 | F1 |
|---|---|---|---|---|---|---|---|
| N |   |   |   |   |   | △ |   |
| D 1st | ○ |   |   |   |   | (○) | ○ |
| 2nd | ○ |   |   |   | ○ | △ |   |
| 3rd | ○ |   | ○ |   |   |   |   |
| 4th | ○ |   |   | ○ |   |   |   |
| 5th | ○ | ○ |   |   |   |   |   |
| 6th |   | ○ |   | ○ |   |   |   |
| 7th |   | ○ | ○ |   |   |   |   |
| 8th |   | ○ |   | ○ |   |   |   |
| Rev1 |   |   | ○ |   |   | ○ |   |
| Rev2 |   |   |   | ○ |   | ○ |   |

(○) ENGAGEMENT WHEN ENGINE BRAKING

AUTOMATIC TRANSMISSION CONTROL DEVICE

INCORPORATION BY REFERENCE

The disclosure of Japanese Patent Application No. 2010-079146 filed on Mar. 30, 2010 including the specification, drawings and abstract is incorporated herein by reference in its entirety.

BACKGROUND OF THE INVENTION

The present invention relates to an automatic transmission control device controlling an automatic transmission mounted in a vehicle having a motor, wherein the automatic transmission engages a first friction engagement element and a second friction engagement element by a fluid pressure from a pump operating using motive power from the motor when a shift position is at a reverse traveling position, places the first friction engagement element on standby at a predetermined standby pressure that is higher than a stroke starting pressure by which a piston stroke is started and lower than a complete engagement pressure or engages the first friction engagement at the complete engagement pressure when the shift position is at a non-traveling position, and engages a third friction engagement element as a starting shift speed when the shift position is at a forward traveling position.

DESCRIPTION OF THE RELATED ART

In the related art, as an automatic transmission control device of this type, there has been proposed an automatic transmission control device which selectively turns on or off three clutches C-0 to C-2 and five brakes B-0 to B-4 based on an operation of a select lever, so as to switch a parking (P) position, a reverse (R) position, a neutral (N) position, and a drive (D) position (see Japanese Patent Application Publication No. JP-A-H05-157164). In this control device, when the select lever is in the R position, three elements of the clutch C-2, the brake B-0, and the brake B-4 need be engaged. Accordingly, when the select lever is in the N position as a non-traveling position, the brake B-4 which does not contribute to motive power transmission is placed in an engagement state in advance, and thus a hydraulic pressure is newly applied only to the clutch C-2 and the brake B-0 when the select lever is switched to the R position. In this manner, it is possible to suppress delay in operation of clutches and brakes, that is, delay in response to a shift operation, without increasing the capacity of a hydraulic pressure generation source.

SUMMARY OF THE INVENTION

Considering switching from the D position to the R position via the N position, when there is a sufficient stop period at the N position, the brake B-4 can be engaged during this period, and thus the remaining clutch and brake can be engaged relatively quickly when the shift position has reached the R position. However, when there is no sufficient stop period at the N position and a shift operation from the D position to the R position is performed quickly, engagement of the brake B-4 is not completed on time, and all the necessary clutch and brakes including the brake B-4 should be engaged when the shift position has reached the R position. Thus, formation of the R position is delayed.

It is a main object of an automatic transmission control device of the present invention to enable quick formation of a reverse traveling shift speed without increasing the capacity of a fluid pressure generating source even when a shift operation from a forward traveling position to a reverse traveling position is performed quickly.

In the automatic transmission control device of the present invention, the following means are employed to achieve the above-described main object.

An automatic transmission control device according to a first aspect of the present invention controls an automatic transmission mounted in a vehicle having a motor. The automatic transmission engages a first friction engagement element and a second friction engagement element by a fluid pressure from a pump operating using motive power from the motor when a shift position is at a reverse traveling position, places the first friction engagement element on standby at a predetermined standby pressure that is higher than a stroke starting pressure by which a piston stroke is started and lower than a complete engagement pressure or engages the first friction engagement at the complete engagement pressure when the shift position is at a non-traveling position, and engages a third friction engagement element as a starting shift speed when the shift position is at a forward traveling position. In the automatic transmission control device, when the shift position is at the forward traveling position, the first friction engagement element is placed on standby at the predetermined standby pressure if a vehicle speed is lower than a first predetermined vehicle speed, or releases the predetermined standby pressure if the vehicle speed is equal to or higher than the first predetermined vehicle speed.

In this automatic transmission control device according to the first aspect of the present invention, in the automatic transmission that engages the first friction engagement element and the second friction engagement element by the fluid pressure from the pump operated using motive power from the motor when the shift position is at the reverse traveling position, places the first friction engagement element on standby at a predetermined standby pressure that is higher than the stroke starting pressure by which the piston stroke is started and lower than the complete engagement pressure or engages the first friction engagement element at the complete engagement pressure when the shift position is at a non-traveling position, and engages the third friction engagement element as the starting shift speed when the shift position is at the forward traveling position, with the shift position at the forward traveling position, the first friction engagement element is placed on standby at the predetermined standby pressure if a vehicle speed is lower than a first predetermined vehicle speed, or the standby pressure is released if the vehicle speed is equal to or higher than the first predetermined vehicle speed. Placing the first friction engagement element on standby at a standby pressure higher than the stroke starting pressure when the shift position is at the forward traveling shift position reduces the number of friction engagement elements to which the fluid pressure should be supplied with the shift position at the reverse traveling position, even when a shift operation from the forward traveling position to the reverse traveling position is performed quickly. As a consequence, formation of the reverse traveling shift speed can be performed in a shorter time. The flow rate of a fluid supplied to the first friction engagement element increases while a piston of the first friction engagement element is stroking, that is, while the volume of an operating fluid chamber of the first friction engagement element to which an engagement fluid pressure is supplied is changing. By supplying a fluid pressure equal to or higher than the stroke starting pressure to the first friction engagement element in advance, the change amount of the volume of the operating fluid chamber of the first friction engagement element can be reduced when a shift operation to the reverse traveling position is performed, and the flow rate of a fluid supplied to the first friction engagement element when the shift operation to the reverse traveling position is performed and the discharge amount of fluid required by the pump can be reduced. Accordingly, the pump can be made smaller. Normally, the reverse traveling position is not accepted when the vehicle speed is relatively high. Thus, releasing of the standby pressure when the vehicle speed is equal to or higher than the first predetermined vehicle speed prevents occurrence of dragging of the first friction engagement element depending on the shift speed being formed, and the efficiency of the vehicle can be improved further. The "predetermined standby pressure" includes a fluid pressure larger than the stroke end pressure which causes engagement of the first friction engagement element with slipping, and a fluid pressure lower than the stroke end pressure. The "complete engagement pressure" is a hydraulic pressure which causes engagement of the first friction engagement element without slipping.

In the automatic transmission control device according to a second aspect of the present invention as above, the first friction engagement element may be placed on standby at the predetermined standby pressure on a condition that a rotation speed of the motor is equal to or higher than a predetermined rotation speed. This makes it possible for the first friction engagement element to be placed on standby at an engagement standby pressure after confirming that the fluid pressure discharged from the pump is sufficient.

In the automatic transmission control device according to a third aspect of the present invention, when the vehicle speed becomes lower than the first predetermined vehicle speed when other different friction engagement element from the first friction engagement element is being engaged, the first friction engagement element may be placed on standby at the predetermined standby pressure after waiting until the engagement of the other friction engagement element is completed. Accordingly, the discharge amount of the pump required at a time can be reduced, and the pump can be made small. In the automatic transmission control device according to a fourth aspect of the present invention that performs neutral control is performed to place the third friction engagement element in a predetermined neutral state when the shift position is at the forward traveling position and a neutral control condition is met, and hill-hold control is performed to engage a fourth friction engagement element for suppressing reverse rotation of an output shaft of the automatic transmission. In the automatic transmission control device of this aspect, while the hill-hold control to engage the fourth friction engagement element as the other different friction engagement element is being performed, the first friction engagement element may be placed on standby at the predetermined standby pressure after waiting until the engagement of the fourth friction engagement element is completed. When the motor is structured as an internal combustion engine, the internal combustion engine is placed in an idle-rotation state during the neutral control. Thus, by supplying a hydraulic pressure to the first friction engagement element after waiting until engagement of the fourth friction engagement element is completed, the necessary discharge amount of the pump when the rotation speed of the internal combustion engine is low can be reduced, and the pump can be made smaller.

In the automatic transmission control device according to a fifth aspect of the present invention, formation of a reverse traveling shift speed is prohibited regardless of the shift position when the vehicle speed is equal to or higher than a second predetermined vehicle speed. In the automatic transmission device of this aspect, the first predetermined vehicle speed may be set to a vehicle speed higher than the second predetermined vehicle speed. Accordingly, even when a certain length of time is required for placing the first friction engagement element on standby at the predetermined standby pressure, such standby at the predetermined standby pressure can be established by the time when formation of the reverse traveling shift speed is permitted. As a consequence, no matter what timing the shift operation from the forward traveling position to the reverse traveling position is performed, it is possible to suppress occurrence of delay in formation of the reverse traveling shift speed.

The automatic transmission control device according to a sixth aspect of the present invention further includes a planetary gear mechanism that has a first rotation element connected to an input shaft side via a first clutch, a second rotation element connected to the input shaft side via a second clutch and connected to a case via a second brake, a third rotation element connected to an output shaft side, and a fourth rotation element connected to the input shaft side via a third clutch and connected to the case via a first brake, which have a relation of rotation speed ratios in order of the fourth rotation element, the second rotation element, the third rotation element, and the first rotation element, wherein the first friction engagement element is the second brake, the second friction engagement element is the third clutch, and the third friction engagement element is the first clutch. In the automatic transmission control device of this aspect, while the vehicle is coasting with the shift position at a neutral position as the non-traveling position, the predetermined standby pressure on the second brake may be released or no engagement pressure may be supplied thereto. When none of the first to third clutches and the first and second brakes are engaged, the third rotation element coupled to the output shaft side of the planetary gear mechanism rotates at a rotation speed depending on the vehicle speed, and the other three rotation elements rotate in a balanced manner independently from the rotation of the third rotation element. However, when the second brake is engaged, the second rotation element to which the second brake is connected is fixed, and thus rotation of the first rotation element accelerates with respect to the rotation speed of the third rotation element. This acceleration in rotation may adversely affect efficiency of the planetary gear mechanism, and may cause dragging of the first clutch connected to the first rotation element. Therefore, while the vehicle is coasting with the shift position at the neutral position, occurrence of such a disadvantage is avoided by releasing the standby pressure on the second brake or by supplying no engagement pressure thereto, and traveling resistance can be reduced.

DETAILED DESCRIPTION OF THE EMBODIMENTS

Next, an embodiment of the present invention will be described using examples.

Figure 1:
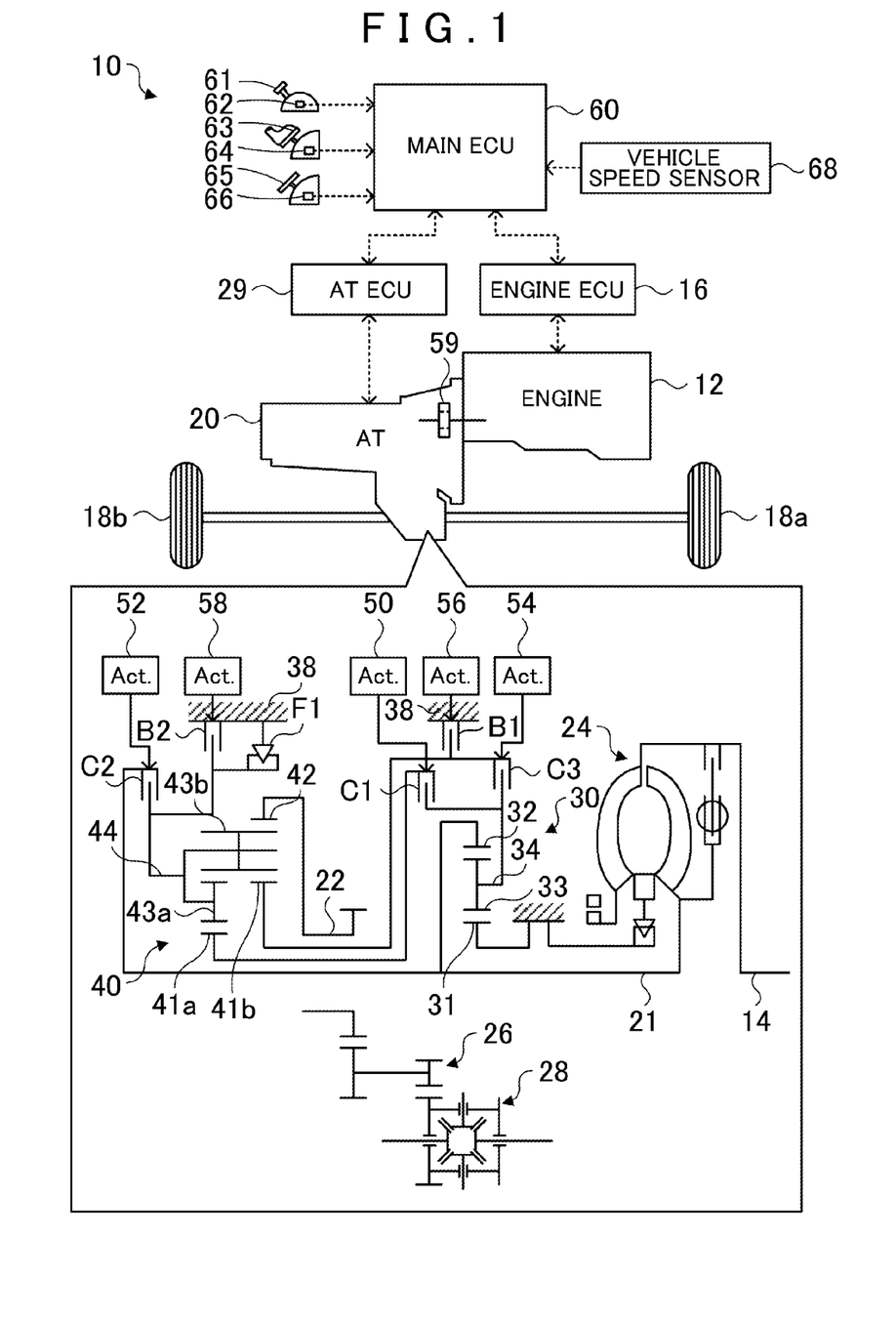
FIG. 1 is a structural diagram illustrating an overview of the structure of an automobile 10 having a transmission apparatus as one embodiment of the present invention.
Figure 2:
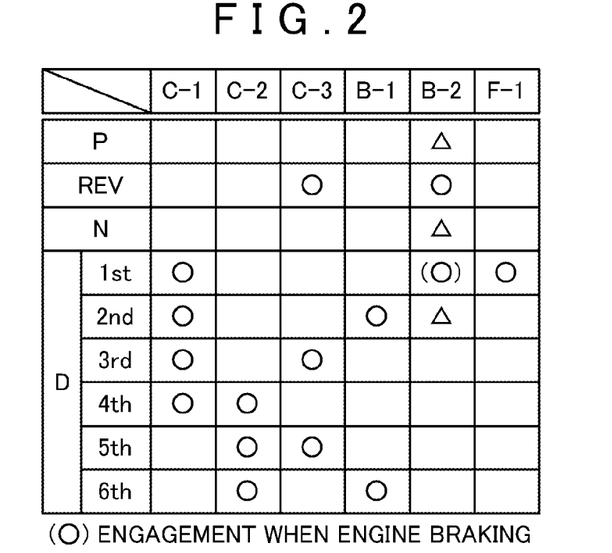
FIG. 2 is an explanatory diagram illustrating an operation table of an automatic transmission 20.
Figure 3:
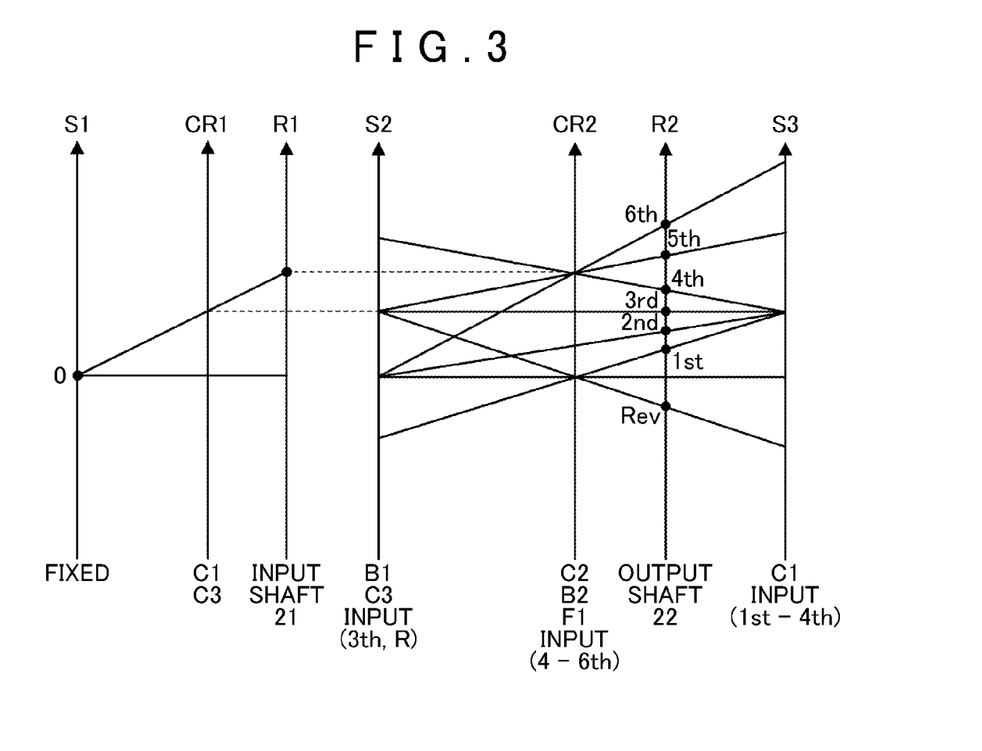
FIG. 3 is a collinear diagram illustrating a relation of rotation speeds of respective rotation elements of the automatic transmission 20.

FIG. 1 is a structural diagram illustrating an overview of the structure of an automobile 10 having a transmission apparatus as one embodiment of the present invention. FIG. 2 illustrates an operation table of an automatic transmission 20. FIG. 3 is a collinear diagram illustrating a relation of rotation speeds of respective rotation elements of the automatic transmission 20. As illustrated in FIG. 1, the automobile 10 of the embodiment has: an engine 12 as an internal combustion engine outputting motive power by explosive combustion of hydrocarbon fuel such as gasoline and diesel oil; a torque converter 24 with a lock-up clutch attached to a crank shaft 14 of the engine 12, the stepped automatic transmission 20 having an input shaft 21 connected to an output side of the torque converter 24 and an output shaft 22 connected to driving wheels 18a, 18b via a gear mechanism 26 and a differential gear 28, and shifting the motive power inputted to the input shaft 21 and transmitting the shifted motive power to the output shaft 22; and a main electronic control unit (hereinafter referred to as a main ECU) 60 controlling the entire vehicle.

The operation of the engine 12 is controlled by an engine electronic control unit (hereinafter referred to as an engine ECU) 16. Although not illustrated in detail, the engine ECU 16 is structured as a microprocessor with a CPU as a main component, and has a ROM storing processing programs, a RAM temporarily storing data, an input/output port, and a communication port besides the CPU. To this engine ECU 16, signals from various sensors required for controlling operation of the engine 12, such as an engine speed sensor attached to the crank shaft 14, are inputted via an input port, and from the engine ECU 16, a drive signal to a throttle motor adjusting a throttle opening, a control signal to a fuel injection valve, an ignition signal to spark plugs, and so on are outputted via an output port. The engine ECU 16 communicates with the main ECU 60, controls the engine 12 by a control signal from the main ECU 60, and outputs data related to the operation state of the engine 12 to the main ECU 60 as necessary.

The automatic transmission 20 is structured as a stepped six-speed transmission, and has a single pinion type planetary gear mechanism 30, a Ravigneaux type planetary gear mechanism 40, three clutches C1, C2, C3, two brakes B1, B2, and a one-way clutch F1. The single pinion type planetary gear mechanism 30 has a sun gear 31 as an external gear, a ring gear 32 as an internal gear arranged concentrically with the sun gear 31, a plurality of pinion gears 33 meshing with the sun gear 31 and with the ring gear 32, and a carrier 34 rotatably and revolvably holding the plurality of pinion gears 33. The sun gear 31 is fixed to a case 38, and the ring gear 32 is connected to the input shaft 21. The Ravigneaux type planetary gear mechanism 40 has two sun gears 41a, 41b as external gears, a ring gear 42 as an internal gear, a plurality of short pinion gears 43a meshing with the sun gear 41a, a plurality of long pinion gears 43b meshing with the sun gear 41b and the plurality of short pinion gears 43a and with the ring gear 42, and a carrier 44 coupling the plurality of short pinion gears 43a and the plurality of long pinion gears 43b and holding these pinion gears rotatably and revolvably. The sun gear 41a is connected to the carrier 34 of the single pinion type planetary gear mechanism 30 via the clutch C1. The sun gear 41b is connected to the carrier 34 via the clutch C3 and to the case 38 via the brake B1. The ring gear 42 is connected to the output shaft 22. The carrier 44 is connected to the input shaft 21 via the clutch C2. The carrier 44 is connected to the case 38 via the brake B2, and to the case 38 via the one-way clutch F1.

In the automatic transmission 20 thus structured, it is possible to switch among first to sixth forward speeds, a reverse speed, and a neutral, by combinations of turning on and off of the clutches C1 to C3 (hereinafter, turning on refers to engagement and turning off refers to disengagement, and the same applies thereafter) and turning on and off of the brakes B1, B2, as illustrated in the operation table of FIG. 2 and the collinear diagram of FIG. 3.

A state of the first forward speed can be formed by turning on the clutch C1 and turning off the clutches C2, C3 and the brakes B1, B2, or by turning on the clutch C1 and the brake B2 and turning off the clutches C2, C3 and the brake B1. In this state, motive power inputted to the ring gear 32 of the single pinion type planetary gear mechanism 30 from the input shaft 21 is decelerated by receiving a reaction force on the sun gear 31 side by fixing the sun gear 31, and is transmitted to the sun gear 41a of the Ravigneaux type planetary gear mechanism 40 via the carrier 34 and the clutch C1. Motive power inputted to the sun gear 41a is decelerated by receiving a reaction force on the carrier 44 side by fixing the carrier 44 by the one-way clutch F1, and is outputted to the output shaft 22 via the ring gear 42. Thus, motive power inputted to the input shaft 21 is decelerated with a relatively large speed reduction ratio and outputted to the output shaft 22. In the state of the first forward speed, while engine braking is performed, the carrier 44 is fixed instead of the one-way clutch F1 by turning on the brake B2. A state of the second forward speed can be formed by turning on the clutch C1 and the brake B1 and turning off the clutches C2, C3 and the brake B2. In this state, motive power inputted to the ring gear 32 of the single pinion type planetary gear mechanism 30 from the input shaft 21 is decelerated by receiving a reaction force on the sun gear 31 side by fixing the sun gear 31, and is transmitted to the sun gear 41a of the Ravigneaux type planetary gear mechanism 40 via the carrier 34 and the clutch C1. Motive power inputted to the sun gear 41a is decelerated by receiving a reaction force on the sun gear 41b side by fixing the sun gear 41b by the brake B1, and is outputted to the output shaft 22 via the ring gear 42. Thus, motive power inputted to the input shaft 21 is decelerated with a smaller speed reduction ratio than that of the first forward speed and outputted to the output shaft 22. A state of the third forward speed can be formed by turning on the clutches C1, C3 and turning off the clutch C2 and the brakes B1, B2. In this state, motive power inputted to the ring gear 32 of the single pinion type planetary gear mechanism 30 from the input shaft 21 is decelerated by receiving a reaction force on the sun gear 31 side by fixing the sun gear 31, and is transmitted to the sun gear 41a of the Ravigneaux type planetary gear mechanism 40 via the carrier 34 and the clutch C1. Motive power inputted to the sun gear 41a is outputted at equal speed to the output shaft 22 via the ring gear 42 by integral rotation of the Ravigneaux type planetary gear mechanism 40 by turning on the clutch C1 and the clutch C3. Thus, motive power inputted to the input shaft 21 is decelerated with a smaller speed reduction ratio than that of the second forward speed and outputted to the output shaft 22. A state of the fourth forward speed can be formed by turning on the clutches C1, C2 and turning off the clutch C3 and the brakes B1, B2. In this state, motive power inputted to the ring gear 32 of the single pinion type planetary gear mechanism 30 from the input shaft 21 is decelerated by receiving a reaction force on the sun gear 31 side by fixing the sun gear 31, and is transmitted to the sun gear 41a of the Ravigneaux type planetary gear mechanism 40 via the carrier 34 and the clutch C1 and, on the other hand, transmitted to the carrier 44 of the Ravigneaux type planetary gear mechanism 40 directly from the input shaft 21 via the clutch C2, thereby determining driving conditions of the ring gear 42, that is, the output shaft 22. Thus, motive power inputted to the input shaft 21 is decelerated with a smaller speed reduction ratio than that of the third forward speed and outputted to the output shaft 22. A state of the fifth forward speed can be formed by turning on the clutches C2, C3 and turning off the clutch C1 and the brakes B1, B2. In this state, motive power inputted to the ring gear 32 of the single pinion type planetary gear mechanism 30 from the input shaft 21 is decelerated by receiving a reaction force on the sun gear 31 side by fixing the sun gear 31, and is transmitted to the sun gear 41b of the Ravigneaux type planetary gear mechanism 40 via the carrier 34 and the clutch C3 and, on the other hand, transmitted to the carrier 44 of the Ravigneaux type planetary gear mechanism 40 directly from the input shaft 21 via the clutch C2, thereby determining the driving conditions of the ring gear 42, that is, the output shaft 22. Thus, motive power inputted to the input shaft 21 is accelerated and outputted to the output shaft 22. A state of the sixth forward speed can be formed by turning on the clutch C2 and the brake B1, and turning off the clutches C1, C3 and the brake B2. In this state, motive power inputted to the carrier 44 of the Ravigneaux type planetary gear mechanism 40 from the input shaft 21 via the clutch C2 is accelerated by receiving a reaction force on the sun gear 41b side by fixing the sun gear 41b by the brake B1, and is outputted to the output shaft 22 via the ring gear 42. Thus, motive power inputted to the input shaft 21 is accelerated by a smaller speed reduction ratio than that of the fifth forward speed and outputted to the output shaft 22.

A state of a first reverse speed can be formed by turning on the clutch C3 and the brake B2 and turning off the clutches C1, C2 and the brake B1. In this state, motive power inputted to the ring gear 32 of the single pinion type planetary gear mechanism 30 from the input shaft 21 is decelerated by receiving a reaction force on the sun gear 31 side by fixing the sun gear 31, and is transmitted to the sun gear 41b of the Ravigneaux type planetary gear mechanism 40 via the carrier 34 and the clutch C3. Motive power inputted to the sun gear 41b is rotated in reverse by receiving a reaction force on the carrier 44 side by fixing the carrier 44 by the brake B2 and outputted to the output shaft 22 via the ring gear 42. Thus, motive power inputted to the input shaft 21 is decelerated with a relatively small speed reduction ratio and outputted to the output shaft 22 as motive power of reverse rotation.

A state of neutral can be formed by turning on the brake B2 and turning off the clutches C1 to C3 and the brake B1, or by turning off all of the clutches C1 to C3 and the brakes B1, B2. In this embodiment, the state of neutral is formed by the former.

The automatic transmission 20 is drive-controlled by an automatic transmission electronic control unit (hereinafter referred to as an ATECU) 29. The ATECU 29 is structured as, although not illustrated in detail, a microprocessor with a CPU as a main component, and has a ROM storing processing programs, a RAM temporarily storing data, an input/output port, and a communication port besides the CPU. To the ATECU 29, an input shaft rotation speed Nin from an input shaft rotation speed sensor attached to the input shaft 21, an output shaft rotation speed Nout from an output shaft rotation speed sensor attached to the output shaft 22, an oil temperature Toil from an oil temperature sensor attached to the hydraulic circuit 50, and so on are inputted via an input port. From the ATECU 29, a drive signal to a hydraulic actuator 50 for turning on and off the clutch C1, a drive signal to a hydraulic actuator 52 for turning on and off the clutch C2, a drive signal to a hydraulic actuator 54 for turning on and off the clutch C3, a drive signal to a hydraulic actuator 56 for turning on and off the brake B1, a drive signal to a hydraulic actuator 58 for turning on and off the brake B2, and so on are outputted via an output port. The ATECU 29 communicates with the main ECU 60, controls the automatic transmission 20 by a control signal from the main ECU 60, and outputs data related to the state of the automatic transmission 20 to the main ECU 60 as necessary. The hydraulic actuators 50 to 58 are formed of linear solenoids and the like which adjust a hydraulic pressure from a mechanical oil pump 59 actuated by motive power from the engine 12 and output the adjusted hydraulic pressure to the respective clutches C1 to C3, and brakes B1, B2.

The main ECU 60 is structured as, although not illustrated in detail, a microprocessor with a CPU as a main component, and has a ROM storing processing programs, a RAM temporarily storing data, an input/output port, and a communication port besides the CPU. To the main ECU 60, a shift position SP from a shift position sensor 62 detecting an operation position of the shift lever 61, an accelerator operation amount Acc from an accelerator pedal position sensor 64 detecting a depressed amount of an accelerator pedal 63, a brake switch signal BSW from a brake switch 66 detecting depression on a brake pedal 65, a vehicle speed V from a vehicle speed sensor 68, and so on are inputted via an input port. Here, for the shift lever 61 in the embodiment, a parking (P) position, a reverse (R) position, a neutral (N) position, and a drive (D) position are arranged in this order, and the clutches C1 to C3 and the brake B1, B2 are turned on and off according to the position selected therefrom. As described above, the main ECU 60 is connected to the engine ECU 16 and the ATECU 29 via the communication port, and exchanges various control signals and data with the engine ECU 16 and the ATECU 29.

Here, the automatic transmission 20 and the ATECU 29 correspond to the transmission apparatus of the embodiment.

Figure 4:
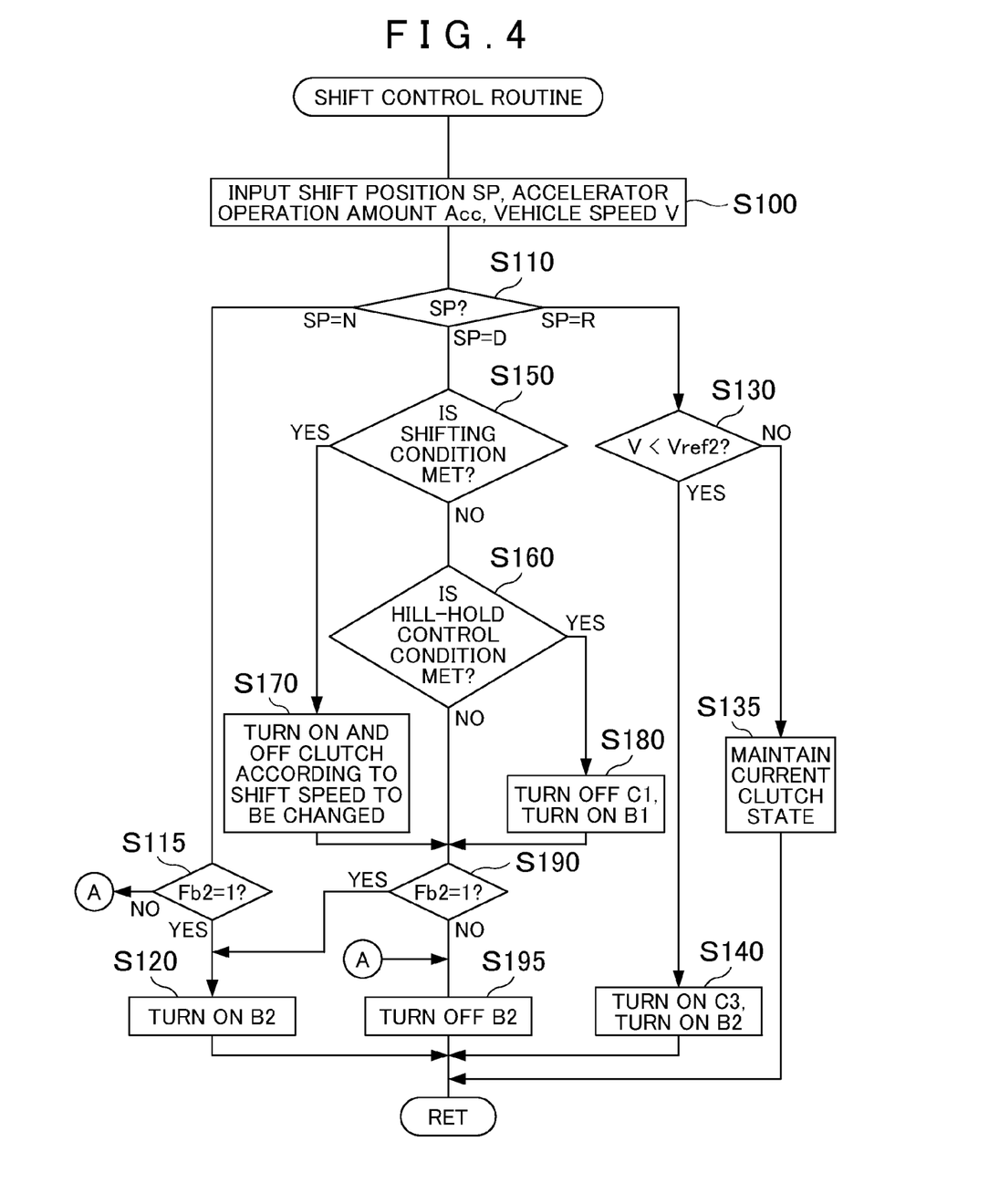
FIG. 4 is a flowchart illustrating an example of a shifting control routine executed by an ATECU 29.

Next, operation of the transmission apparatus of the embodiment included in the thus structured automobile 10, particularly, operation when a shift operation from the D position to the R position is performed will be described. FIG. 4 is a flowchart illustrating an example of a shifting control routine executed by the ATECU 29. This routine is repeatedly executed at every predetermined time (for example, every few msec) from when the ignition is turned on until the ignition is turned off.

When the shifting control routine is executed, the CPU of the ATECU 29 first performs processing by which necessary data for control such as the shift position SP, the accelerator operation amount Acc, the vehicle speed V, and so on are inputted to the ATECU 29 (step S100). Here, the shift position SP, the accelerator operation amount ACC, and the vehicle speed V which are detected by the shift position sensor 62, the accelerator pedal position sensor 64, and the vehicle speed sensor 68, respectively, are inputted from the main ECU 60 via communication. After the data are inputted, the inputted shift position SP is checked (step S110). When it is determined that the shift position SP is at the N (neutral) position, the value of a B2 standby engagement permission determination flag Fb2, which will be described later, indicating whether standby engagement of the brake B2 is permitted or not is checked (step S115). When the B2 standby engagement permission determination flag Fb2 has a value 1, it is determined that the standby engagement of the brake B2 is permitted, and the hydraulic actuator 58 is controlled so that the brake B2 is turned on (step S120). When the B2 standby engagement permission determination flag Fb2 has a value 0, it is determined that the standby engagement of the brake B2 is prohibited, and the hydraulic actuator 58 is controlled so that the brake B2 is turned off (step S195) and this routine is finished. On the other hand, when it is determined that the shift position SP is at the R position, it is determined whether or not the vehicle speed V is lower than a reverse traveling shift speed forming permission vehicle speed Vref2 (step S130). When the vehicle speed V is lower than the reverse traveling shift speed forming permission vehicle speed Vref2, the hydraulic actuators 54, 58 are controlled so that the clutch C3 and the brake B2 are turned on (step S140) and this routine is finished. When the vehicle speed V is equal to or higher than the reverse traveling shift speed forming permission vehicle speed Vref2, the current state of clutches and brakes is maintained (step S135) and this routine is finished. Accordingly, when a shift operation from the N position to the R position is performed, only the clutch C3 needs be turned on. Thus, the discharge amount required at a time from the mechanical oil pump 59 can be reduced, and the first reverse speed can be formed quickly.

When it is determined in step S110 that the shift position SP is at the D (drive) position, whether a shifting condition is met or not is determined (step S150), and whether a hill-hold control condition is met or not is determined (step S160). Here, the determination of the shifting condition can be performed by setting a target shift speed based on the accelerator operation amount Acc, the vehicle speed V, and a shift map, and comparing the set target shift speed with the current shift speed. The determination of the hill-hold control condition can be performed by determining whether or not all of the following conditions are met: the shift position SP is at the D position, the vehicle speed V is lower than a predetermined vehicle speed, the accelerator is off, the brake is on, the engine 12 is operating, and so on. Note that the hill-hold control condition is met when a neutral control condition in which the clutch C1 is on standby at a hydraulic pressure equal to or lower than a stroke end pressure and the input shaft 21 and the output shaft 22 are disengaged is met. When the shifting condition is met, the shift speed for which the condition is met is set among the first forward speed to the sixth forward speed, and the respective hydraulic actuators 50 to 58 are controlled so that the necessary clutch and brake illustrated in FIG. 2 among the clutches C1 to C3 and the brakes B1, B2 are turned on according to the set shift speed, and the unnecessary clutch and brake which are on are turned off (step S170). When the hill-hold control condition is met, the hydraulic actuators 50, 56 are controlled to turn on the brake B1 for suppressing reverse rotation of the output shaft 22 (hill-hold control) (step S180), in addition to neutral control. Then the value of the B2 standby engagement permission determination flag Fb2 is checked (step S190). When the B2 standby engagement permission determination flag Fb2 has a value 1, it is determined that the standby engagement of the brake B2 is permitted, and the hydraulic actuator 58 is controlled so that the brake B2 is turned on (step S120). When the B2 standby engagement permission determination flag Fb2 has a value 0, it is determined that the standby engagement of the brake B2 is prohibited, and the hydraulic actuator 58 is controlled so that the brake B2 is turned off (step S195) and this routine is finished. Here, since this routine is repeatedly executed at every predetermined time (for example, every several msec), the processing of step S170 of shifting control, the processing of step S180 of hill-hold control, and the processing of step S120 of standby engagement of the brake B2 are performed repeatedly until these steps are completed (turning on and turning off of the corresponding clutch and brake are completed). The brake B2 is standby-engaged in this manner also when the shift position SP is at the D position because, considering the case where the shift operation from the D position to the R position via the N position is performed, when there is a sufficient stop period at the N position, the brake B2 is standby-engaged in this period, but when there is no sufficient stop period at the N position, the standby engagement of the brake B2 at the N position may not be performed on time. Accordingly, when the shift operation from the D position to the R position is performed quickly, only the clutch C3 needs be turned on when the position R is reached. Thus, the discharge amount required at a time from the mechanical oil pump 59 can be reduced, and the first reverse speed can be formed quickly. Here, in this embodiment, the standby engagement of the brake B2 is performed by applying a hydraulic pressure slightly higher than the stroke end pressure to the brake B2, and is performed only when the shift speed is the first forward speed or the second forward speed. At the first forward speed, the brake B2 is engaged completely instead of the standby engagement during engine braking. When the shift operation to the R position is performed in a state that the brake B2 is not engaged completely, it is necessary to supply the hydraulic pressure until the brake B2 is engaged completely, but the discharge amount required at a time from the mechanical oil pump 59 can be reduced as compared to the one which does not standby-engage the brake B2. The B2 standby engagement permission determination flag Fb2 in steps S115, S190 is set by executing the B2 standby engagement permission setting routine exemplified in FIG. 5. This B2 standby engagement permission setting routine is repeatedly executed at every predetermined time (for example, every several msec) from when the ignition is turned on until the ignition is turned off similarly to the shifting control routine, and the value of the flag Fb2 used in step S190 of shifting control routine is updated every time the B2 standby engagement permission setting routine is executed.

Figure 5:
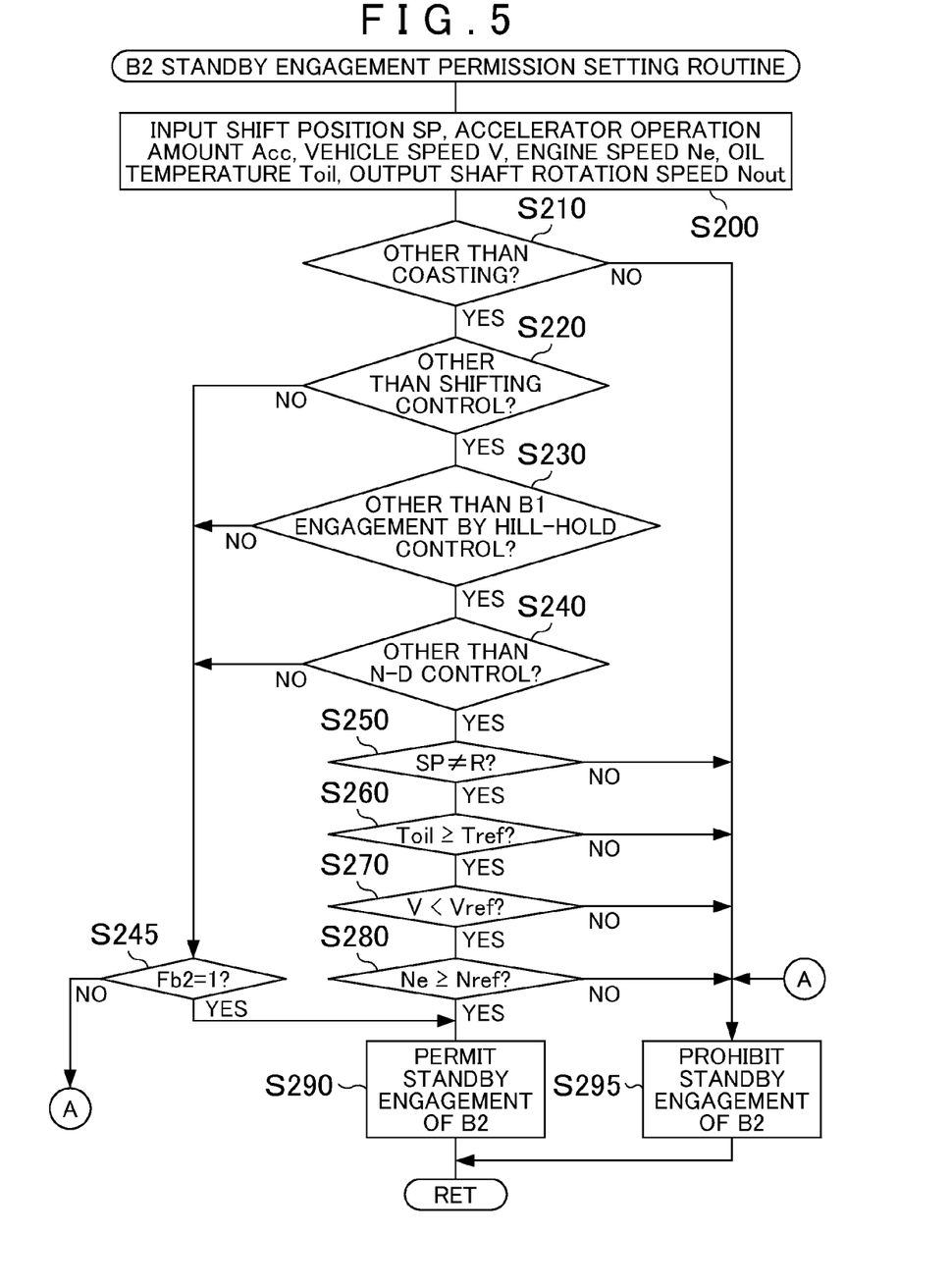
FIG. 5 is a flowchart illustrating an example of a B2 standby engagement permission setting routine executed by the ATECU 29.

When the B2 standby engagement permission setting routine is executed, the CPU of the ATECU 26 first performs processing by which necessary data for control such as the shift position SP, the accelerator operation amount Acc, the vehicle speed V, the engine speed Ne, the oil temperature Toil, the output shaft rotation speed Nout, and so on are inputted to the ATECU 26 (step S200). Here, the oil temperature Toil and the output shaft rotation speed Nout detected by the oil temperature sensor and the output shaft rotation speed sensor, respectively, are inputted. The engine speed Ne detected by the engine speed sensor is inputted from the engine ECU 16 via the main ECU 60 by communication. Inputting of the shift position SP, the accelerator operation amount Acc, and the vehicle speed V is described above already.

Figure 6:
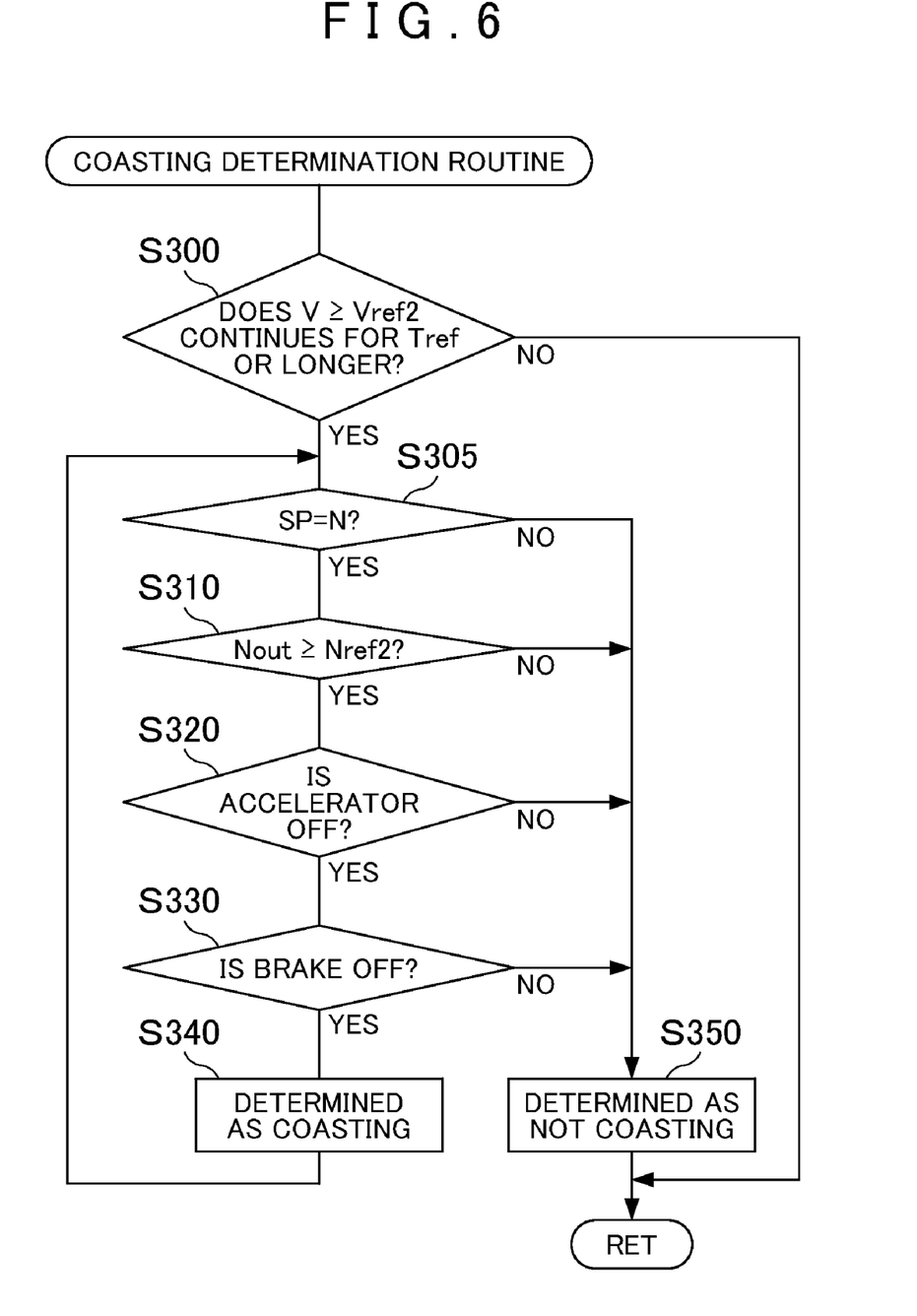
FIG. 6 is a flowchart illustrating an example of a coasting determination routine executed by the ATECU 29.

When the data are inputted in this manner, determinations are made as to whether the vehicle is in a condition other than coasting (step S210), whether the vehicle is in a condition other than the above-described shifting control (step S220), whether the vehicle is in a condition other than engagement of the brake B1 by the above-described hill-hold control (step S230), whether the vehicle is in a condition other than N-D control to turn on the clutch C1 when a shift operation from the N position to the D position is performed (step S240), whether the shift position SP is at any other position than the R position (step S250), whether the oil temperature Toil is equal to or higher than a threshold Tref (step S260), whether the vehicle speed V is lower than a threshold Vref (step S270), and whether the engine speed Ne is equal to or higher than a threshold Nref (step S280). When all the determinations of steps S210 to S280 are affirmative, a value 1 is set to the B2 standby engagement permission determination flag Fb2 to permit the standby engagement of the brake B2 (step S290). When any one of the determinations of steps S210, S250 to S280 is negative, a value 0 is set to the B2 standby engagement permission determination flag Fb2, the standby engagement of the brake B2 is prohibited (step S295), and this routine is finished. When any one of the determinations of steps S220 to S240 is negative, the value of the B2 standby engagement permission determination flag Fb2 is checked (step S245). When the B2 standby engagement permission determination flag Fb2 has a value 1, permission of the standby engagement of the brake B2 is continued (step S290). When the B2 standby engagement permission determination flag Fb2 has a value 0, prohibition of the standby engagement of the brake B2 is continued (step S295), and this routine is finished. Here, the determination of coasting is made by executing a coasting determination routine illustrated in FIG. 6. In this coasting determination routine, it is determined whether a state in which the vehicle speed V is equal to or higher than the threshold Vref2 continues for a predetermined time Tref (several seconds for example) or longer (step S300). When the state does not continue for the predetermined time, it is determined that it is not appropriate to determine coasting, and this routine is finished. On the other hand, when it is determined that the state in which the vehicle speed V is equal to or higher than the threshold Vref2 continues for the predetermined time Tref or longer, then determinations are made as to whether the shift position SP is at the N position (step S305), whether the output shaft rotation speed Nout is equal to or higher than a threshold Nref2 (step S310), whether the accelerator is off (throttle is off) (step S320), and whether the brake is off (step S330). When all of the determinations of steps S305 to S330 are affirmative, it is determined that the vehicle is coasting (step S340). This determination of coasting is continued until any one of the determinations of steps S305 to S330 becomes negative. When it is determined that any one of these determinations is negative, it is determined that the vehicle is not coasting (step S350), and this routine is finished. Considering the case where none of the clutches C1 to C3 and brakes B1, B2 are engaged at the N position, in the Ravigneaux type planetary gear mechanism 40, the ring gear 42 connected to the output shaft 22 rotates at the rotation speed of the output shaft 22, and the sun gears 41a, 41b and the carrier 44 rotate independently from the rotation of the ring gear 42 in a balanced manner with a relatively small difference in rotation from each other. On the other hand, considering the case where only the brake B2 is engaged at the N position, rotation of the carrier 44 connected to the brake B2 is fixed. Thus, the sun gear 41a accelerates with respect to the rotation speed of the ring gear 42 and its rotation resistance increases, and dragging of the clutch C1 may occur depending on the remaining hydraulic pressure on the clutch C1 connected to the sun gear 41a. The standby engagement of the brake B2 is prohibited while the vehicle is coasting at the N position so as to avoid such a disadvantage and decrease traveling resistance accompanying the coasting. The standby engagement of the brake B2 is prohibited: for supplying to a clutch and a brake a necessary hydraulic pressure for the shifting control during the shifting control; for supplying to the brake B1 a necessary hydraulic pressure for the hill-hold control when the brake B1 is being engaged in the hill-hold control; and for supplying to the clutch C1 a necessary hydraulic pressure for switching from the neutral to the first forward speed during the N-D control. Accordingly, a situation that the hydraulic pressure is supplied at a time to two or more clutches and brakes is avoided, and the clutches and the brakes can be turned on appropriately by a sufficient hydraulic pressure. Therefore, when the shifting control, the hill-hold control (engagement of the brake B2), or the N-D control is completed, the standby engagement of the brake B2 is permitted if the other conditions are met. In the determination in step S250 in this embodiment, it is determined whether the shift speed is the first forward speed or the second forward speed when the shift position is at the D (drive) position as described above. The threshold Tref used in step S260 is defined as a value near the lower limit of an appropriate temperature range, and the threshold Vref used in step S270 is defined as a value slightly higher than the threshold Vref2 which is the reverse traveling shift speed forming permission vehicle speed, and the threshold Nref used in step S280 is defined as a value near the lower limit of the engine speed by which the mechanical oil pump 59 can be operated. Therefore, in the determinations in steps S260 to S280, it is determined whether or not the oil temperature Toil is at an appropriate temperature, whether or not the vehicle speed V is lower than the vehicle speed (threshold Vref) slightly higher than the reverse traveling shift speed forming permission vehicle speed Vref2, and whether or not the engine speed Ne is at a sufficient rotation speed for operating the mechanical oil pump 59, respectively. Since the standby engagement of the brake B2 is performed for forming the first reverse speed quickly when the shift operation to the R position is performed, basically, it may be performed when the vehicle speed V is lower than the reverse traveling shift speed forming permission vehicle speed Vref2. However, in this embodiment, the threshold Vref is defined as a value higher than the reverse traveling shift speed forming permission vehicle speed in consideration of the time required for the standby engagement.

According to the transmission apparatus of the embodiment described above, in the vehicle including the automatic transmission 20 which forms the first reverse speed by turning on the brake B2 and the clutch C3 when the shift position SP is at the R (reverse) position, the brake B2 is standby-engaged if the standby engagement of the brake B2 is permitted due to that the vehicle speed V is lower than the threshold Vref, and so on, when the shift position SP is at the D (drive) position in addition to when the shift position SP is at the N (neutral) position. Thus, when the shift lever 61 is operated quickly from the D position to the R position, the hydraulic pressure needs to be applied only to the remaining clutch C3, and the first reverse speed can be formed quickly. As a consequence, a small pump can be used as the mechanical oil pump 59, and the entire apparatus can be made smaller. Moreover, since the threshold Vref is set to the value slightly higher than the reverse traveling shift speed forming permission vehicle speed Vref2 in consideration of the time required for the standby engagement of the brake B2, the shift operation to the R position can be accepted in a state that the brake B2 is standby-engaged immediately when the vehicle speed V changes from a speed equal to or higher than the reverse traveling shift speed forming permission vehicle speed Vref2 to a speed lower than the reverse traveling shift speed forming permission vehicle speed Vref2. Since the standby engagement of the brake B2 is not performed when the shift position SP is at the N position and the vehicle is coasting, it is possible to prevent increase in traveling resistance due to engagement of the brake B2 while the vehicle is coasting. Further, since the standby engagement of the brake B2 is also prohibited when the brake B1 is being engaged by the shifting control or the hill-hold control, it is possible to prevent supply of hydraulic pressure to two or more clutches and brakes at a time from the mechanical oil pump 59. Engagement of respective clutches and brakes can be performed more appropriately, and the mechanical oil pump 59 can be made small.

In the transmission apparatus of the embodiment, a hydraulic pressure slightly higher than the stroke end pressure is applied as the standby engagement of the brake B2, but as long as the hydraulic pressure is higher than a stroke starting pressure by which a piston stroke is started, a hydraulic pressure at any level may be applied within the range not affecting formation of a shift speed. However, for a shift speed (for example, the second forward speed) that is subject to, for example, dragging, by engagement of the brake B2, use of a hydraulic pressure lower than the stroke end pressure may be desired.

In the transmission control of the embodiment, the standby engagement of the brake B2 when the shift position is at the D position is performed only for the first forward speed and the second forward speed. However, the transmission control may be performed only for the first forward speed, may be performed for the first to third forward speeds, may be performed for the first to fourth forward speeds, may be performed for the first to fifth forward speeds, or may be performed for all the shift speeds.

In the transmission apparatus of the embodiment, in the B2 standby engagement permission determination routine of FIG. 5, the conditions for permitting the standby engagement of the brake B2 include that the vehicle is not coasting and that the oil temperature Toil is equal to or higher than the threshold Tref. However, any one of or both of the conditions may be omitted.

Figure 7:
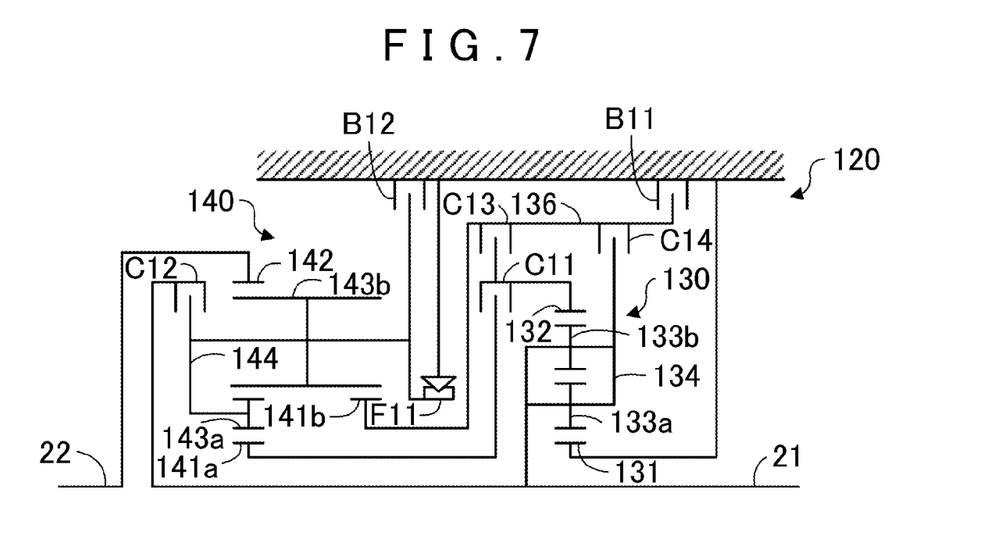
FIG. 7 is a structural diagram illustrating an overview of the structure of an automatic transmission 120 of a modification example.
Figure 8:
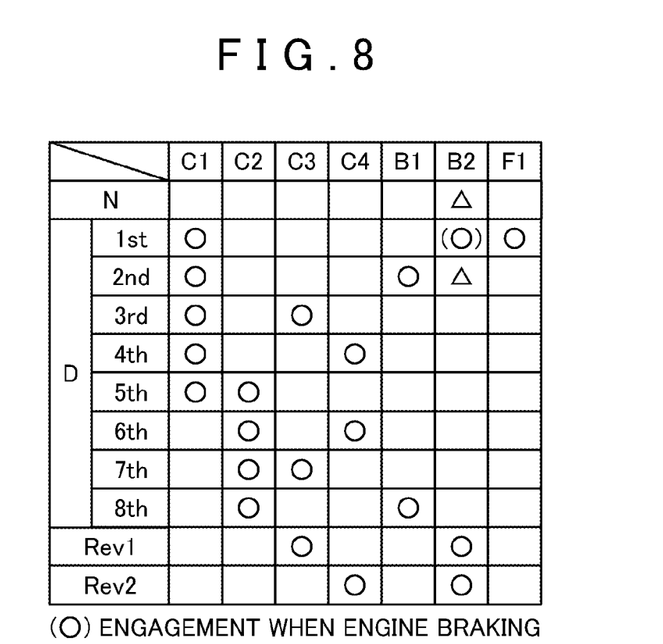
FIG. 8 is an explanatory diagram illustrating an example of an operation table of the automatic transmission 120.

In the transmission apparatus of the embodiment, the automatic transmission 20 is structured of a stepped six-speed transmission of first forward speed to sixth forward speed. However, the automatic transmission is not limited to this, and may be structured of a stepped transmission with two to five speeds or may be structured of a stepped transmission with seven or more speeds. For example, as illustrated in an automatic transmission 120 of a modification example in FIG. 7, the transmission apparatus may be structured of a stepped transmission with eight speeds. The automatic transmission 120 of the modification example has, as illustrated in FIG. 7, a double pinion type planetary gear mechanism 130, a Ravigneaux type planetary gear mechanism 140, four clutches C11, C12, C13, C14, two brakes B11, B12, and a one-way clutch F11. The double pinion type planetary gear mechanism 130 has a sun gear 131 as an external gear, a ring gear 132 as an internal gear arranged concentrically with the sun gear 131, a plurality of first pinion gears 133a meshing with the sun gear 131, a plurality of second pinion gears 133b meshing with the first pinion gear 133a and with the ring gear 132, and a carrier 134 rotatably and revolvably holding the first and second pinion gears 133a, 133b. The sun gear 131 is fixed to a case 38, the ring gear 132 is connected to a rotation shaft 136 via the clutch C13, and the carrier 134 is connected to the rotation shaft 136 via the clutch C14. This rotation shaft 136 is structured to freely rotate or be fixed by turning on or off the brake B11. The Ravigneaux type planetary gear mechanism 140 has two sun gears 141a, 141b as external gears, a ring gear 142 as an internal gear, a plurality of short pinion gears 143a meshing with the sun gear 141a, a plurality of long pinion gears 143b meshing with the sun gear 141b and the plurality of short pinion gears 143a and with the ring gear 142, and a carrier 144 coupling the plurality of short pinion gears 143a and the plurality of long pinion gears 143b and holding these pinion gears rotatably and revolvably. The sun gear 141a is connected to the ring gear 132 of the double pinion type planetary gear mechanism 130 via the clutch C11. The sun gear 141b is connected to the rotation shaft 136. The ring gear 142 is connected to an output shaft 22. The rotational of the carrier 144 is restricted to one direction by the one-way clutch F11 and freely rotates or is fixed by turning on or off the brake B12, and is connected to the input shaft 21 via the clutch C12. An operation table of the automatic transmission 120 of the modification example is illustrated in FIG. 8.

Here, the correspondence between the major elements of the embodiments and the major elements of the invention described in the Summary of the Invention section will be described. In the embodiments, the engine 12 corresponds to the "motor", the mechanical oil pump 59 corresponds to the "pump", the brake B2 corresponds to the "first friction engagement element", the clutch C3 corresponds to the "second friction engagement element", and the clutch C1 corresponds to the "third friction engagement element". The brake B1 corresponds to the "fourth friction engagement element". The clutch C1 corresponds to the "first clutch", the clutch C2 corresponds to the "second clutch", the clutch C3 corresponds to the "third clutch", the brake B1 corresponds to the "first brake", and the brake B2 corresponds to the "second brake". Here, the "motor" is not limited to internal combustion engines outputting motive power by using hydrocarbon fuel such as gasoline or diesel fuel, and may be any type of internal combustion engine such as a hydrogen engine, or may be a motor such as an electric motor. It should be noted that the correspondence between the major elements of the embodiments and the major elements of the invention described in the Summary of the Invention section are examples for specifically describing the best modes for carrying out the invention described in the Summary of the Invention section, and thus the correspondence does not limit the elements of the invention described in the Summary of the Invention section. That is to say, the invention described in the Summary of the Invention section should be construed based on the description in that section, and the embodiments are merely specific examples of the invention described in the Summary of the Invention section.

In the foregoing, the best modes for carrying out the present invention has been described using the embodiments, but the present invention is not limited to such embodiments at all. It is needless to mention that the present invention can be implemented in various modes within the range not departing from the scope of the invention.

The present invention may be applied to the automobile industry.

What is claimed is:

1. An automatic transmission control device controlling an automatic transmission mounted in a vehicle having a motor, wherein
the automatic transmission engages a first friction engagement element and a second friction engagement element by a fluid pressure from a pump operating using motive power from the motor when a shift position is at a reverse traveling position, places the first friction engagement element on standby at a predetermined standby pressure that is higher than a stroke starting pressure by which a piston stroke is started and lower than a complete engagement pressure or engages the first friction engagement at the complete engagement pressure when the shift position is at a non-traveling position, and engages a third friction engagement element as a starting shift speed when the shift position is at a forward traveling position, and when the shift position is at the forward traveling position, the first friction engagement element is placed on standby at the predetermined standby pressure if a vehicle speed is lower than a first predetermined vehicle speed, or releases the predetermined standby pressure if the vehicle speed is equal to or higher than the first predetermined vehicle speed.

2. The automatic transmission control device according to claim 1, wherein
the first friction engagement element is placed on standby at the predetermined standby pressure on a condition that a rotation speed of the motor is equal to or higher than a predetermined rotation speed.

3. The automatic transmission control device according to claim 1, wherein
when the vehicle speed becomes lower than the first predetermined vehicle speed when other different friction engagement element from the first friction engagement element is being engaged, the first friction engagement element is placed on standby at the predetermined standby pressure after waiting completion of the engagement of the other friction engagement element.

4. The automatic transmission control device according to claim 3, wherein
neutral control is performed to place the third friction engagement element in a predetermined neutral state when the shift position is at the forward traveling position and a neutral control condition is met, and hill-hold control is performed to engage a fourth friction engagement element for suppressing reverse rotation of an output shaft of the automatic transmission, and
while the hill-hold control to engage the fourth friction engagement element as the other different friction engagement element is being performed, the first friction engagement element is placed on standby at the predetermined standby pressure after waiting until the engagement of the fourth friction engagement element is completed.

5. The automatic transmission control device according to claim 1, wherein
formation of a reverse traveling shift speed is prohibited regardless of the shift position when the vehicle speed is equal to or higher than a second predetermined vehicle speed, and
the first predetermined vehicle speed is set to a vehicle speed higher than the second predetermined vehicle speed.

6. The automatic transmission control device according to claim 1, further including:
a planetary gear mechanism that has a first rotation element connected to an input shaft side via a first clutch, a second rotation element connected to the input shaft side via a second clutch and connected to a case via a second brake, a third rotation element connected to an output shaft side, and a fourth rotation element connected to the input shaft side via a third clutch and connected to the case via a first brake, which a relation of rotation speed ratios in order of the fourth rotation element, the second rotation element, the third rotation element, and the first rotation element, wherein
the first friction engagement element is the second brake, the second friction engagement element is the third clutch, and the third friction engagement element is the first clutch, and
while the vehicle is coasting with the shift position at a neutral position as the non-traveling position, the predetermined standby pressure on the second brake is released or no engagement pressure is supplied thereto.

* * * * *